United States Patent [19]

Schechter

[11] Patent Number: 5,064,166

[45] Date of Patent: Nov. 12, 1991

[54] SOLENOID VALVE WITH HIGH FLOW CAPACITY AND LOW ENERGY CONSUMPTION

[75] Inventor: Michael M. Schechter, Farmington Hills, Mich.

[73] Assignee: Ford Motor Company, Dearborn, Mich.

[21] Appl. No.: 585,322

[22] Filed: Sep. 20, 1990

[51] Int. Cl.$^5$ ............................................. F16K 31/06
[52] U.S. Cl. ........................... 251/129.15; 251/129.07; 137/454.2
[58] Field of Search ...................... 251/129.21, 129.15, 251/129.07; 137/454.2

[56] References Cited

U.S. PATENT DOCUMENTS

| | | | |
|---|---|---|---|
| 3,368,789 | 2/1968 | Martin | 251/141 |
| 4,541,610 | 9/1985 | Reynolds et al. | 251/129.21 |
| 4,883,252 | 11/1989 | Mesenich | 251/129.21 X |
| 4,917,150 | 4/1990 | Koch et al. | 251/129.21 X |
| 4,944,486 | 7/1990 | Babitzka | 251/129.15 X |

FOREIGN PATENT DOCUMENTS 543807 3/1977 U.S.S.R. .

*Primary Examiner*—Arnold Rosenthal
*Attorney, Agent, or Firm*—Allan J. Lippa; Roger L. May

[57] ABSTRACT

A solenoid valve for highly efficient control of high flow capacities comprises an armature formed as a sleeve having one end closing against the valve seat. A ring-shaped protrusion on the sleeve forms a conical surface facing a corresponding conical surface on a stationary part of the solenoid valve body separated by a predetermined gap to form magnetic poles within the magnetic flux path generated by the solenoid coil. The application of electrical current to the coil generates the magnetic force across the gap which displaces the sleeve in an axial direction toward a stop ring carried by the valve body. The end of the sleeve engaging the stop ring includes recesses for adjusting the net force when fluid pressure is exerted against the sleeve as it rests against the stop ring. The net force generated by the fluid pressure is slightly less than a spring force urging the sleeve toward its closed position so that a substantial decay of the magnetic field occurs before the sleeve is displaced when the current has been shut off to the coil. When the sum of the decayed magnetic force and the net fluid force drops below the force of the spring, displacement of the sleeve away from the stop ring exposes the end of the sleeve to hydraulic fluid force and immediately reduces the net fluid force to zero to quicken the response time of the armature.

14 Claims, 3 Drawing Sheets

SOLENOID VALVE WITH HIGH FLOW CAPACITY AND LOW ENERGY CONSUMPTION

TECHNICAL FIELD

The present invention relates generally to the fluid control valves, and more particularly to solenoid valves with an electromagnetically responsive armature formed from a sleeve.

BACKGROUND ART

Solenoid valves are useful where fluid flow is repeatedly turned on and off. However, such valves have encountered several problems when used to handle large flows of pressurized fluid. When port size is increased to increase flow, the increased mass of the valve used to cover the port often consumes substantial energy to operate the solenoid armature since the mass increases proportionally to the square of the valve diameter. Furthermore, substantial hydraulic losses occur during opening and closing of the valve. Most of the hydraulic losses take place during the early stages of valve opening and the late stages of valve closing when the orifice area is small. An example of a valve system using solenoid valves for variable hydraulic control of the engine valve motion is defined in a co-pending application of the present inventor. Variable engine valve control can save energy by reducing the pumping losses in the engine. However, energy losses associated with an inefficient hydraulic control system can cancel out the benefits associated with reduced pumping.

Martin U.S. Pat. No. 3,368,789 discloses an electromagnetic valve with conical magnetic poles. However, the conical pole surface is formed on a disk carried by an armature in the shape of a frustum. A valve ring is also carried by the armature and rests against an annular valve seat in the valve body. This armature construction has substantial mass which would increase substantially as a function of the diameter of the armature. As a result, the armature has a high initial mass when made for a large valve orifice size.

Such a construction substantially restricts the practical size of the orifice which may be employed with the valve construction shown in the patent. In addition, hydraulic forces acting on the valve and the armature are not balanced. When the valve is closed, the armature is subject to axial fluid pressure force. Furthermore, a high spring force preload may be required to close the valve or to keep the valve closed. Higher spring forces require higher magnetic force to open the valve by displacing the armature. As a result, substantially more electrical energy is consumed, and the valve motion is relatively slow. As a result, the patented construction is subject to high hydraulic losses during opening and closing and less accurate control of the fluid flow than may be desired in particular applications such as engine valve operation.

Russian Patent No. 543,807 discloses a solenoid valve in which the armature includes a plurality of concentric sleeves. A valve stem is secured to the central sleeve and carries an enlarged head valve which closes against an annular valve seat. Like the construction of the valve in U.S. Pat. No. 3,368,789, increases in the size of the valve to correspond with enlargements of the outlet substantially increase the mass of material which must be moved to open and close the valve. Such mass reduces the reaction time of the valve and increases the energy required to move the valve. Moreover, the pressure of the fluid acts against the valve and further increases the energy required to open the valve, and slower reaction of the valve increases the hydraulic losses occurring during opening and closing of the valve. Furthermore, when the size of the valve outlet is small, a substantially longer stroke is required to avoid restriction of the flow of fluid through the valve outlet. Although the use of three concentric armature sleeves achieves a smaller air gap while permitting a long stroke of the stem, such a construction is substantially more expensive than conical pole solenoid armatures.

In both of the above-discussed prior art references, it may be appreciated that the magnetic field decays gradually once electrical power to the coil has been interrupted. The valve does not return to its seated position until the magnetic field force decays below the spring force to return the valve to its closed position. As a result, movement of the valve is initiated slowly as the spring force opposes the residual magnetic force. Moreover, when the valve is closed, the hydraulic pressure against the valve tends to keep it closed against the valve seat, and thus requires a higher magnetic force to move the valve from its closed position.

TECHNICAL PROBLEMS SOLVED

The present invention overcomes the above-mentioned disadvantages by providing a solenoid valve with an armature shaped as a sleeve. A conical ring on the sleeve is aligned with a correspondingly slanted conical surface on the valve housing to form an air gap in the magnetic flow path permitting longitudinal displacement of the armature. An end of the sleeve can engage a valve seat surface surrounding a valve outlet opening. The sleeve shape provides the advantage that a relatively large outlet opening can be closed by a valve whose mass varies proportionally rather than exponentially with the size of the opening. This contrasts substantially with the prior art valve structures in which closure of a large outlet results in substantial increases in mass related to the square of the size of the valve body required to cover the opening.

The preferred cylindrical shape of the armature also provides the advantage of balancing hydraulic pressure so that the hydraulic forces do not affect opening or closing of the valve. In the closed position, it will be appreciated that the pressure against the periphery of the sleeve is in a direction perpendicular to the axial direction of movement. As a result, these hydraulic forces do not interfere with opening of the valve.

In the preferred embodiment, the end of the sleeve opposite the valve end is provided with cut-outs to equalize the hydraulic fluid pressures on the sleeve when the valve is open and the end engages a stop ring surface in the housing. Since engagement of the sleeve against the ring surface prevents fluid pressure from acting on the axial end of the sleeve, a net force tends to retain the sleeve in its open position. Preferably, the size and number of the cut-outs is determined so that the magnitude of the axial force due to fluid pressure is slightly less than the spring force biasing the valve toward the closed position. Accordingly, when the valve is fully open, the spring force is almost completely balanced by the hydraulic force, even if there is no magnetic force. As a result, the return motion of the armature is delayed beyond deenergizing of the solenoid coil until the decay of the magnetic field is nearly complete. When the spring urges the armature away from the stop ring, the hydraulic force instantly disappears, and the spring-driven armature completes its return unopposed by magnetic or hydraulic pressure forces to increase the speed of closing the valve.

As a result, the present invention provides a solenoid valve which requires less energy consumption to operate and provides substantially faster opening and closing time. The tubular construction of the sleeve reduces the mass which must be displaced to open and close the valve, and the wall thickness may be varied as necessary to reduce the mass of the sleeve or increase the strength of the valve. Moreover, the counter-balancing of hydraulic forces enables the valve to operate more efficiently. In addition, the use of hydraulic forces to balance the spring force and to delay return of the armature against the force of the spring while the magnetic field is decaying also serves to reduce hydraulic losses previously incurred when the closing action was slowed by both magnetic force and hydraulic pressure resisting the spring. Furthermore, armature biasing can be accomplished with a substantially smaller spring force. Moreover, a small axial displacement of a large diameter sleeve still provides a substantial area through which fluid can be delivered to the outlet of the valve. These and other advantages will be more clearly understood by reference to the following detailed description.

BRIEF DESCRIPTION OF THE DRAWINGS

The present invention will be more clearly understood by reference to the following detailed description when read in conjunction with the accompanying drawing in which like reference characters refer to like parts throughout the views and in which.

BEST MODE FOR CARRYING OUT THE INVENTION

Figure 1:
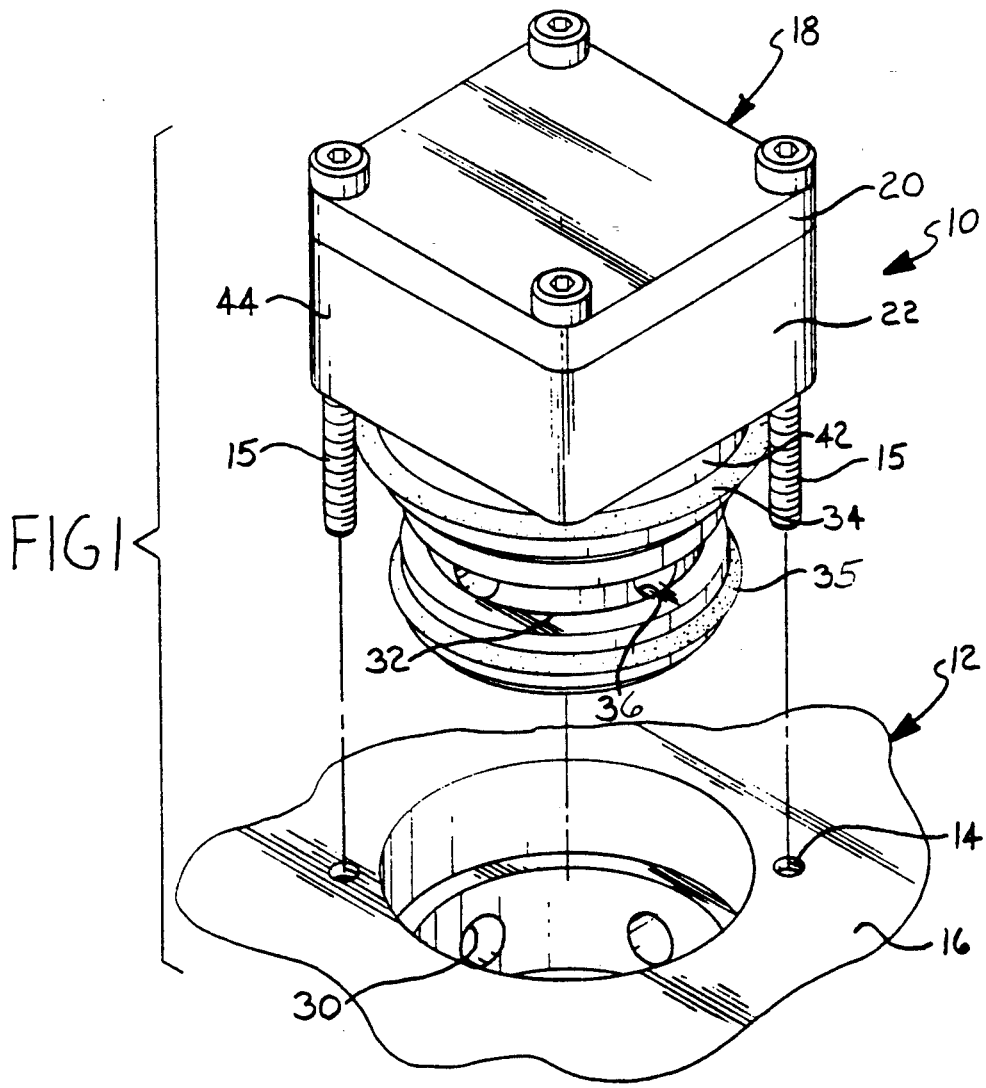
FIG. 1 is a perspective view of a valve according to the present invention and a preferred structural installation for the valve.

Referring first to FIG. 1, a valve 10 constructed in accordance with the present invention is shown positioned for installation in the fluid system housing 12. As shown in FIG. 1, threaded apertures 14 in a receiving surface 16 of the body 12 receive threaded fasteners 15 extending through diagonally opposite apertures in the valve housing 18. The valve housing 18 also includes an upper cap 20 and a lower body 22 which are secured together by diagonally spaced threaded studs 24 extending through an opening in the cap 20 and threadably engaged within apertures in the body 22. The elongated studs 15 extend through registering apertures in the cap 20 and body 22.

Figure 2:
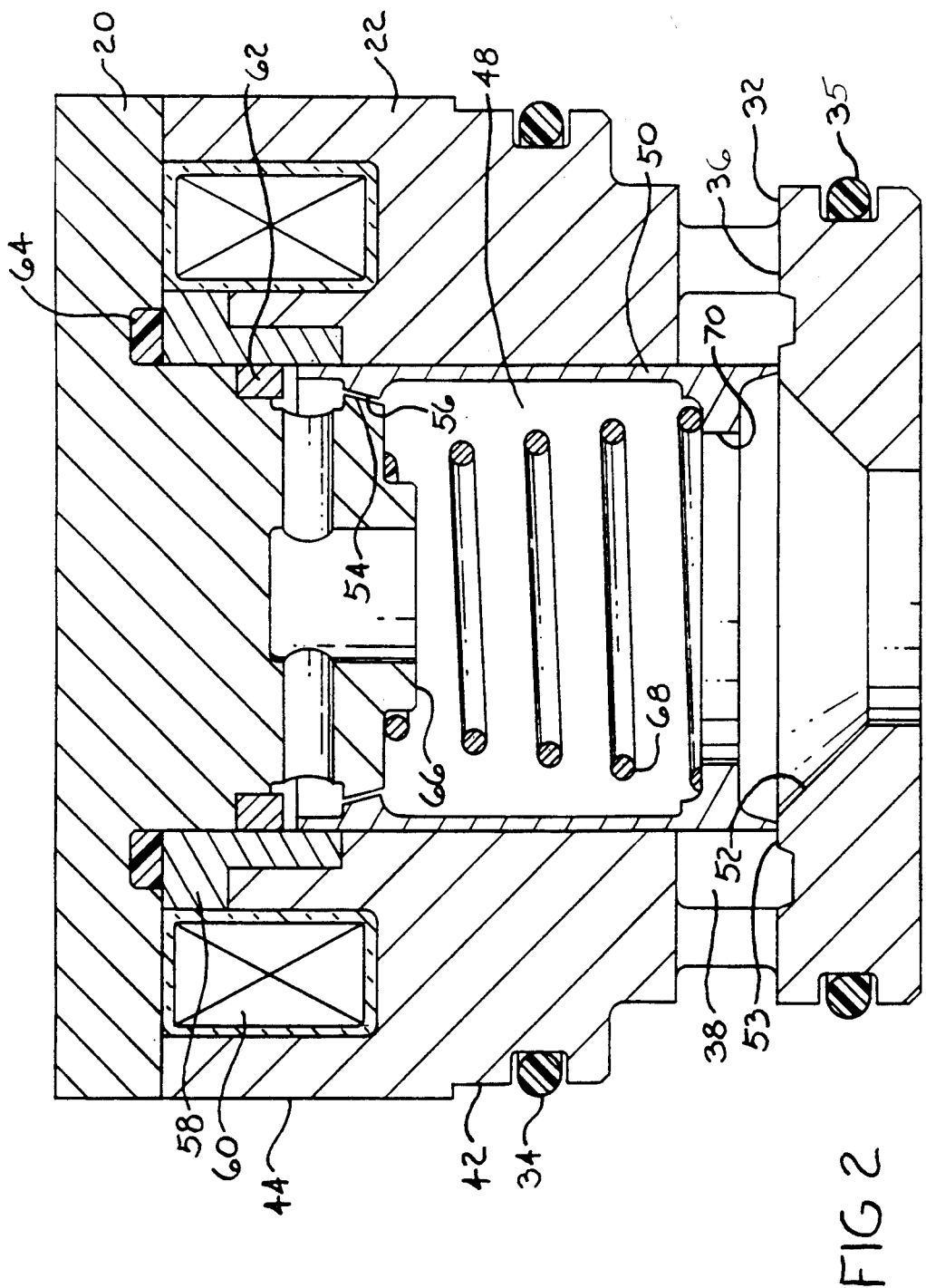
FIG. 2 is a sectional view of the valve shown in FIG. 1.

In the installed position, fluid passageways 30 in the fluid system body 12 communicate with an annular recess 32 sealed off by the seal rings 34 and 35. The body 22 also includes radial ports 36 communicating with an interior annular chamber 38 (FIG. 2). The lower body portion 42 of the body 22 is substantially cylindrical as shown in FIG. 1, and the upper portion 44 of the body 22 is rectangular and abuts against the surface 16 of the fluid system body 12. In addition, the fluid system body 12 includes concentric wall portions registering with the seal members 34 and 35 so as to seal the flow path between the passageway 30 and the inlet chamber 38 (FIG. 2) of the valve 10.

As best shown in FIG. 2, the body 22 contains a central chamber 48 adapted to receive a cylindrical sleeve 50 for sliding movement along the chamber. One end of the chamber communicates with the inlet chamber 38, and the axial end of the body 22 includes an outlet orifice 52. With the sleeve 50 axially displaced toward the outlet 52, the sleeve 50 surrounds the outlet orifice 52 and closes off communication between the inlet chamber 38 and the outlet orifice 52.

The other end of the chamber 48 is closed by a central portion of the cap 20. The central portion of the cap 20 includes a conical portion 54 which is spaced from a correspondingly slanted conical surface 56 on the sleeve 50. In the preferred embodiment, it will be seen that the conical surface 56 on the sleeve extends radially inwardly from the wall of the sleeve. Nevertheless, it will be understood that the conical extension could also be part of or mounted on the radially outer side of the sleeve 50 and a correspondingly slanted conical surface formed on an adjacent portion of the valve housing 18. A non-magnetic sleeve 58 is interposed between the valve body 22 and the cap 20 adjacent an annular cavity. A solenoid coil 60 is carried by the body 22 in the annular cavity beneath the cap 20. The non-magnetic sleeve 58 assures that the magnetic flux generated while electrical current is applied to the coil 60 flows through a path forced to pass through the small gap between the conical surfaces 54 and 56.

Displacement of the sleeve 50 toward the center of the coil 60 is restricted by a stop ring 62 carried by the cap 20. The cap 20 also includes fluid passageways communicating with the chamber 48 and the interior of the sleeve 50 so that fluid pressure within the cavity is equalized within the sleeve. An annular ring 64 is interposed between the sleeve 58 and the cap 20 to avoid oil leakage exteriorly of the valve body 18. In addition, a central axial projection 66 in the central portion of the cap 20 extends into the open end of a coil spring 68 while the other end of the coil spring 68 rests against the radially extending flange 70 in the sleeve 50.

Figure 3:
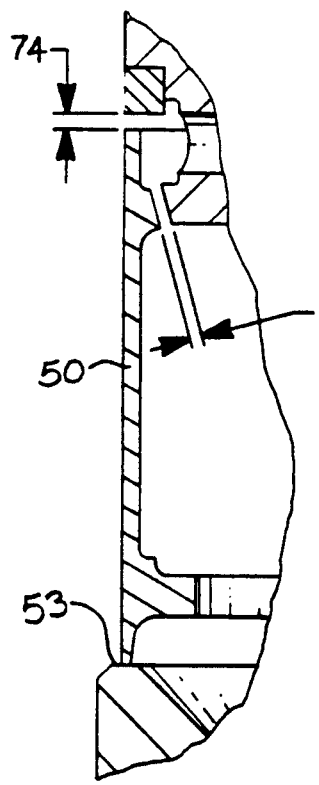
FIG. 3 is a fragmentary sectional view of the valve shown in FIGS. 1 and 2.
Figure 4:
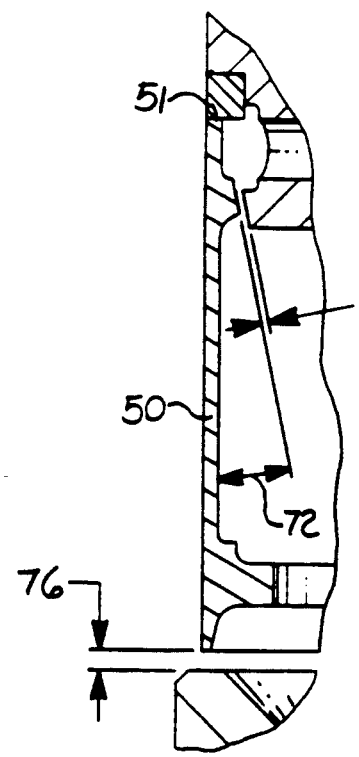
FIG. 4 is a fragmentary sectional view similar to FIG. 3 but showing the armature in a different operative position.

Referring now to FIGS. 3 and 4, a small conical angle, diagonally indicated at 72 in FIG. 4, permits operation of the sleeve with very small change in the air gap between the surfaces 54 and 56. Moreover, the valve stroke represented by the gap 74 in FIG. 3 and the gap 76 in FIG. 4 can be minimized where the diameter of the sleeve 50 is very large while still providing a large flow area communicating between the inlet chamber 38 and the outlet 52. Consequently, even though the valve orifice 52 may be very large, a small displacement of the sleeve 50 permits a large volume of fluid to pass from the inlet chamber 38 to the outlet 52.

Figure 5:
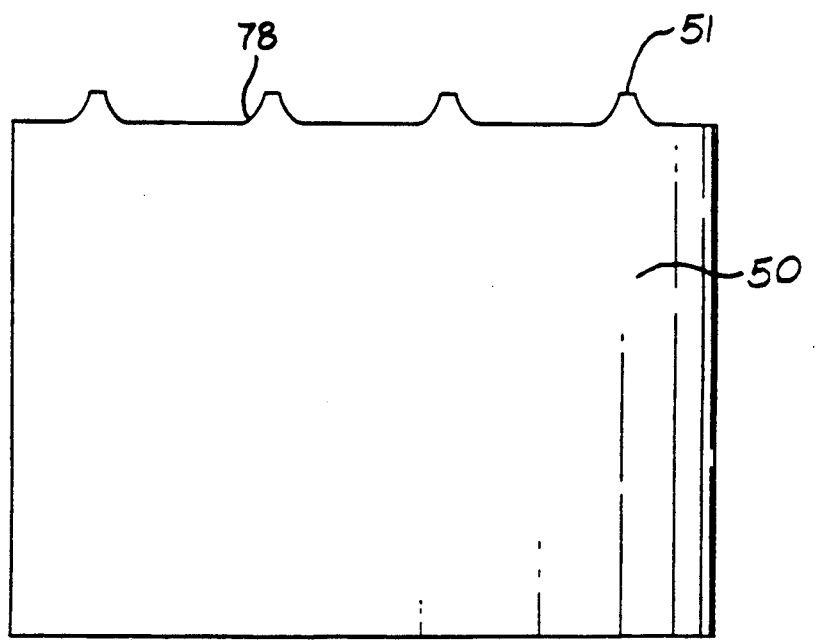
FIG. 5 is a side plan view of an armature used in the valve shown in FIGS. 1-4.

When the sleeve 50 is in the position shown in FIG. 4, the fluid pressure acting upon the sleeve 50 from the inlet chamber 38 can also act within the sleeve 50. Nevertheless, an engagement of the sleeve end 51 with the stop ring 62 prevents fluid from acting upon the surface of the axial end of the sleeve. As a result, it will be understood that fluid pressure produces an axial force which tends to maintain the sleeve 50 in the position shown in FIG. 4. The amount of this force can be reduced by modifying the end of the sleeve as shown in FIG. 5. Preferably, a plurality of cut-outs 78 reduce the surface area of the axial end of the sleeve in engagement with the stop ring 62. Preferably, the surface area of the axial end 51 is adjusted so that the fluid pressure force maintaining the sleeve in the position shown in FIG. 4 is slightly less than the force of the spring urging the sleeve to the position shown in FIG. 3, whereby the spring force is almost completely balanced by the opposing hydraulic force, even if there is no magnetic force.

Having thus described the important structural features of the present invention, the operation of the device is easily described. When a valve 10 is installed in an appropriate receptacle such as the fluid system body 12, the spring 68 forces the sleeve 50 against the valve seat 53 surrounding the outlet 52. Such positioning of the sleeve 50 blocks communication between the interior chamber 38 and the outlet 52. Regardless of the particular shape chosen for the valve surface of the sleeve 50 and the mating valve seat 53, the pressurized fluid from the passages 30 passing through the ports 36 acts in a perpendicular direction against the peripheral surface of the sleeve 50. As a result, the pressure of the fluid against the sleeve acts in a direction which does not affect the action of the spring 68. Moreover, the relatively thin wall of the tubular sleeve 50 may surround a large area orifice, but has substantially less mass than previously known solid body valves. As a result, the spring force required to maintain the sleeve in its closed position can be substantially smaller than previously known solenoid valves.

The magnitude of the magnetic force required to overcome the spring force and open the valve to the position shown in FIG. 4 is largely determined by the current and number of wire turns in the solenoid coil 60, the facing area of the magnetic poles at the conical surfaces 54 and 56, and the distance of the gap between the magnetic poles at the surfaces 54 and 56. It is preferable to use minimal number of turns and surface areas at 54 and 56 since such values would substantially increase the time constant and slow down the response of the solenoid valve. At a given value for the number of turns and given valves for the pole surface areas, the magnetic force is directly proportional to the square of the current applied to the coil 60 and inversely proportional to the square of the gap distance between the surfaces 54 and 56. Minimizing the air gap permits less current and thus less electrical power to be consumed in operating the solenoid valve.

When electrical current is applied to the coil 60, the magnetic flux flows in a flow path through the magnetic cap 20, the magnetic body 22, and the sleeve 50 in a direction determined by the direction of the electric current in a well-known manner. The non-magnetic sleeve 58 forces the flux to jump the gap between the surfaces 54 and 56. The magnetic force generated between the poles of the surfaces 54 and 56 has an axial component which overcomes the force of the spring 68 and pulls the armature 50 against the stop ring 62 as shown in FIG. 4. Since the fluid in inlet chamber 38 does not create any axial force against armature, only the preload of the spring 68 must be overcome to move the sleeve to the position shown in FIG. 4.

When the armature sleeve 50 is in motion, the hydraulic forces cancel out. Nevertheless, when the armatures comes to rest against the stop ring 62, the net pressure force which has been adjusted by the cut-out 78 maintains the sleeve in the position shown in FIG. 4.

The change in the air gap between the positions shown in FIG. 4 is proportional to the sine of angle 72 and inversely proportional to the diameter of the sleeve as demonstrated by $$\delta 1 = 1 \ max - 1 \ min = s \sin \Theta = A/(\pi d) \sin \Theta$$

where:
d is the diameter of outlet 52,
s is the stroke of the armature,
A is the area of the flow path between inlet 38 and outlet 52 when the valve is open, and
$\Theta$ is the angle 72.

When the electric current has been cut off to the coil 60, the magnetic field begins to decay while the fluid pressure maintains the sleeve 50 in the position shown in FIG. 4. Only when the sum of the magnetic flux force and the fluid pressure diminishes below the spring force does the valve 50 begin to close. Moreover, once the sleeve 50 moves toward the position shown in FIG. 3, the entire axial end 51 of the sleeve 50 is exposed to fluid pressure and immediately eliminates substantially all net force which retained the sleeve in the position shown in FIG. 4. As a result, displacement of the sleeve 50 as it returns to the position shown in FIG. 3 is substantially faster than in previously known solenoid constructions where the spring force acts directly against the decaying magnetic force and only gradually displaces the sleeve in a slower reaction. Accordingly, only a small stroke i.e. 74 in FIG. 3 and 76 in FIG. 4 is necessary to provide a large flow area when the sleeve diameter is large. Thus, the valve closes substantially faster than previously known valves and avoids the substantial hydraulic losses which occur during the closing of the valves in previously known solenoid valves.

As a result, it will be understood that the present invention provides a fast-acting solenoid valve which requires substantially less energy input than previously known solenoid valves. As a result, substantially more accurate control of fluid flow can be obtained with the valve of the present invention. In addition, the valve operates more efficiently and consumes substantially less energy than previously known solenoid valves in large flow applications. Nevertheless, the components can be simply and inexpensively made while providing a substantially greater flow area for communication between the inlet and the outlet of the valve.

Having thus described the present invention, many modifications thereto will become apparent to those skilled in the art to which it pertains without departing from the scope and spirit of the present invention as defined in the appended claims.

I claim:
1. A solenoid valve comprising:
   a hollow body defining a chamber and including at least one inlet port and an outlet port in fluid communication with said chamber;
   a tubular sleeve plunger slidable in said chamber and having an annular end aligned for engagement with a valve seat surface around said outlet port;
   a coil carried by said body in a longitudinally displaced location from said sleeve whereby said coil induces an electromagnetic force urging said sleeve away from said valve seat surface;
   a stop for limiting sleeve displacement away from said valve seat surface;
   a spring resiliently urging said sleeve against said valve seat surface; and a conical ring surface on said sleeve facing a corresponding conical surface on said body and wherein said conical surfaces are spaced apart a predetermined distance when said annular end is engaged against said valve seat surface.

2. A solenoid valve comprising:
a hollow body defining a chamber and including at least one inlet port and an outlet port in fluid communication with said chamber;
a magnetic tubular sleeve plunger slidable in said chamber and having an annular end aligned for engagement with a valve seat surface around said outlet port;
a coil carried by said body in a longitudinally displaced location from said sleeve whereby said coil induces an electromagnetic force urging said sleeve away from said valve seat surface;
a stop for limiting sleeve displacement away from said valve seat surface; and
a spring resiliently urging said sleeve against said valve seat surface.

3. The invention as disclosed in claim 1 wherein said conical ring surface is aligned at an acute angle to the sleeve length.

4. The invention as disclosed in claim 1 wherein said stop comprises a ring surface carried by said body.

5. The invention as disclosed in claim 4 wherein the other end of said tubular sleeve includes longitudinal recesses reducing the annular surface area engageable against said ring surface.

6. The invention as disclosed in claim 1 wherein said conical ring surface on said body extends radially inwardly from said sleeve.

7. The invention as disclosed in claim 1 wherein said plunger and said annular end are formed in one piece.

8. The invention as disclosed in claim 1 and further comprising means for reducing the surface area of the axial end of the sleeve in engagement with the stop.

9. The invention as disclosed in claim 2 and further comprising a conical ring surface on said sleeve facing a corresponding conical surface on said body and wherein said conical surfaces are spaced apart a predetermined distance when said annular end is engaged against said valve seat surface.

10. The invention as disclosed in claim 2 and further comprising a conical ring surface on said sleeve facing a corresponding conical surface on said body and wherein said conical surfaces are spaced apart a predetermined distance when said annular end is engaged against said valve seat surface.

11. The invention as disclosed in claim 2 wherein said plunger and said annular end are formed in one piece.

12. The invention as disclosed in claim 2 and further comprising means for reducing the surface area of the axial end of the sleeve in engagement with the stop.

13. A solenoid valve comprising:
a hollow body defining a chamber and including at least one inlet port and an outlet port in fluid communication with said chamber;
a tubular sleeve plunger slidable in said chamber and having an annular end aligned for engagement with a valve seat surface around said outlet port;
a coil carried by said body in a longitudinally displaced location from said sleeve whereby said coil induces an electromagnetic force urging said sleeve away from said valve seat surface;
a stop for limiting sleeve displacement away from said valve seat surface; and
a spring resiliently urging said sleeve against said valve seat surface;
wherein said stop comprises a ring surface carried by said body; and
the other end of said tubular sleeve includes longitudinal recesses reducing the annular surface area engagable against said ring surface.

14. A solenoid valve comprising:
a hollow body defining a chamber and including at least one inlet port and an outlet port in fluid communication with said chamber;
a tubular sleeve plunger slidable in said chamber and having an annular end aligned for engagement with a valve seat surface around said outlet port;
a coil carried by said body in a longitudinally displaced location from said sleeve whereby said coil induces an electromagnetic force urging said sleeve away from said valve seat surface;
a stop for limiting sleeve displacement away from said valve seat surface;
a spring resiliently urging said sleeve against said valve seat surface; and
means for educing the surface area of the axial end of the sleeve in engagement with the stop.

* * * * *

UNITED STATES PATENT AND TRADEMARK OFFICE
CERTIFICATE OF CORRECTION

PATENT NO. : 5,064,166

DATED : November 12, 1991

INVENTOR(S) : Michael M. Schechter

It is certified that error appears in the above-identified patent and that said Letters Patent is hereby corrected as shown below:

Column 8, line 45 (Claim 14), delete "educing" and substitute --reducing--.

Signed and Sealed this

Sixteenth Day of March, 1993

*Attest:*

STEPHEN G. KUNIN

*Attesting Officer*        *Acting Commissioner of Patents and Trademarks*